April 1, 1941.   G. SCHNEIDER   2,236,766
PROCESS OF COATING
Filed Dec. 30, 1937
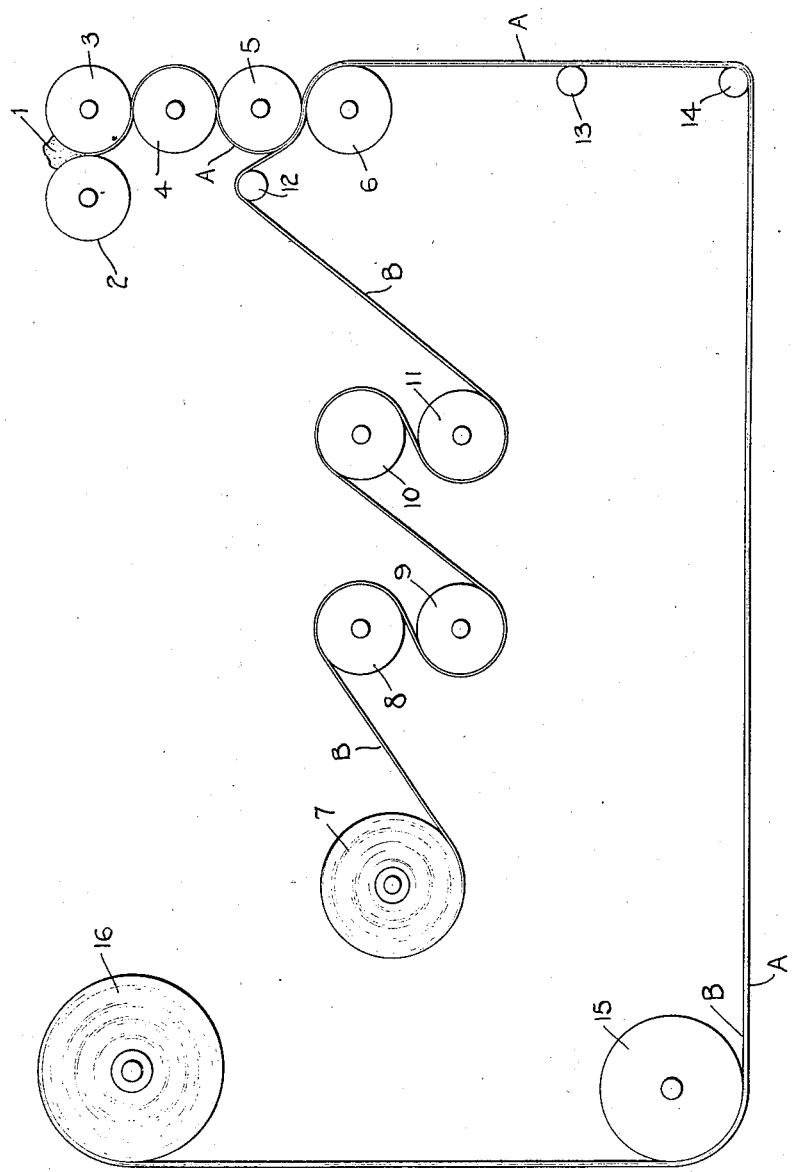
INVENTOR
George Schneider
BY
ATTORNEYS Patented Apr. 1, 1941

2,236,766

UNITED STATES PATENT OFFICE 2,236,766

PROCESS OF COATING

George Schneider, Montclair, N. J., assignor to Celanese Corporation of America, a corporation of Delaware Application December 30, 1937, Serial No. 182,391

8 Claims. (Cl. 91—70)

This invention relates to the coating of sheet materials with compositions of thermoplastic compounds, and relates more particularly to the application of coatings comprising derivatives of cellulose to surfaces of sheet material.

An object of my invention is to form coatings in a simple, economic and expeditious manner on fabric, paper, wood, composition board, metal or any porous, flexible or rigid sheet material.

Another object of my invention is to prepare coatings of compositions comprising derivatives of cellulose upon surfaces of porous sheet material, which coatings are supple, flexible and strong, have little tendency to crack on sharp bending, have a desirable appearance and do not become tacky on exposure to atmospheric conditions.

A further object of this invention is the application of plastic compositions containing thermoplastic derivatives of cellulose to surfaces of sheet material without the use of solvents or extraneous adhesives.

Other objects of this invention will appear from the following detailed description and the appended claims.

In the coating of fabrics and the like for the preparation of artificial leather and similar products, solutions comprising derivatives of cellulose have been heretofore employed. This method was open to many serious objections such as expense, toxicity of some of the solvents employed and the large number of successive coatings which were necessary to build up a layer of even the minimum thickness required to mask the texture of the base material. In the coating of wood or other porous surfaces, when solutions of derivatives of cellulose are used as coating compositions, they do not fill but tend to bridge over the grain and, consequently, such surfaces must be given a preliminary treatment with a filler or the like. When hardwood, metallic or other surfaces are to be covered, ordinary solutions of derivatives of cellulose in volatile solvents cannot be used because of the lack of adhesion of the resulting film to such surfaces and, it is therefore necessaray to incorporate in such solutions, in order to impart the necessary adhesive properties to the resulting film, substances such as gums and resins. The latter introduce complications such as lack of compatibility with the derivative of cellulose, poor light fastness and water resistance, and the tendency to develop brittleness.

In another process which has been used heretofore, a derivative of cellulose together with pigment and plasticizer were ground together in a colloid mill in the presence of an excess of water and then the water was removed from the mixture of derivative of cellulose, plasticizer and pigment by drying. This dried mixture was then fed into a calender roll arrangement and when the mixture became sufficiently fluid it was applied onto the base material. In this process a calender roll temperature, namely, on the order of 150 to 160° C., was necessary to render the mixture sufficiently fluid in order to coat the base material. Furthermore, it was found that unless extreme care was taken the conversion of the derivative of cellulose was not completed, unmelted particles of the derivative of cellulose being present in the coating. Another difficulty in carrying out this process was that the plastic material had a tendency to over-run the ends of the calender rolls and to work its way into the bearings of said rolls. In such a process a high ratio of plasticizer to the derivative of cellulose present was required and due to this high plasticizer content the coated fabric had a tendency to sweat.

I have found that the disadvantages arising from the use of solutions of derivatives of cellulose in volatile solvents and the other expedients previously proposed for coating surfaces with derivatives of cellulose not only may be overcome, but products of superior properties may be obtained, by applying a layer comprising derivatives of cellulose or other thermoplastic compounds together with other desired constituents but containing no, or substantially no, volatile solvents, directly to the surface to be coated solely by means of heat and suitable pressure, and without the aid of adhesives. In order to obtain the proper bonding action and to avoid overheating of the thermoplastic composition with its consequent deleterious effects, the surface of the material to be covered may, if desired, be preheated to a temperature at least equal to that required to render plastic the composition to be applied, while the thermoplastic composition itself may also be preheated, so that upon the application of pressure a firmly adherent union is obtained. After the application of heat and pressure, the coated or laminated product may be chilled in any suitable manner. Preferably, however, the cooling or chilling should be effected through the layer or article that has been coated. In this manner, the maximum heating and chilling effects are obtained in the most important location, namely, the surface contact of the thermoplastic composition and the article that is coated, so that a perfect bonding of the thermoplastic material to the coated base is obtained.

Any suitable organic thermoplastic compound may be employed in accordance with this invention. For instance, I may employ thermoplastic organic derivatives of cellulose such as cellulose esters and cellulose ethers. Examples of organic esters of cellulose are cellulose acetate, cellulose formate, cellulose propionate and cellulose butyrate, and examples of cellulose ethers are ethyl cellulose and benzyl cellulose.

Any desired modifying agent for the thermoplastic compound may be incorporated therewith. By "modifying agent" I mean any substance which is adapted to impart any desired properties such as softness, elasticity, flexibility, hardness, gloss, color, stability, etc. to the finished product. Such modifying agents may be plasticizers, dyes, pigments, lakes, filling materials, resins, oils, etc. Examples of plasticizers are camphor, diethyl phthalate, triacetin, dimethoxy ethyl phthalate, tricresyl phosphate, triphenyl phosphate, ethyl orthotoluene sulphonamide, ethyl paratoluene sluphonamide, etc., the choice of plasticizer depending upon the properties of the thermoplastic compounds employed as the base. The oil employed may be a mineral or vegetable oil. Oils which I have found to be particularly suitable are: formal of castor oil, i. e. the condensation product from castor oil and formaldehyde blown castor oil, oxidized olive oil, acetylated polymerized castor oil, rape seed oil, Perilla oil, Russian mineral oil, and olive oil. Lead oleate may also be employed.

The thermoplastic composition is preferably applied to or laminated with the surface to be treated while the said composition is in a substantially completely converted state. Thus, a layer of an intimate mixture of thermoplastic derivative of cellulose and a plasticizer therefor, with or without a modifying agent but containing substantially no volatile solvents, may be applied to the surface to be coated and the assembly pressed at elevated temperatures. The surface to be coated is preferably preheated.

While the thermoplastic composition may be converted in any suitable manner, the best results are obtained by first partially converting the composition by mixing together 100 parts of thermoplastic derivative of cellulose, 50 to 100 parts of plasticizer, 0 to 5 parts of oil, coloring matter if desired, and 80 to 100 parts of ethyl alcohol, all parts being by weight, in a suitable mixer for a short period of time and then permitting the mixture to stand covered for a further period of time or until a jel has formed. This jel is then transferred to a steam-jacketed mixer where the composition is further partially converted, clarified and its alcoholic content reduced. Preferably, however, the thermoplastic derivative of cellulose, plasticizer, oil and alcohol are mixed together in an S-type Werner-Pfleiderer mixer for about fifteen minutes and permitted to stand covered for about sixteen hours whereupon a very viscous semi-transparent jel is formed, since conversion has begun to take place during this sixteen hour soaking period. The steam-jacketed mixer to which the jel is transferred is preferably a Z-type Werner-Pfleiderer mixer. This mixer containing the jel is operated with its cover on for from 5 to 15 minutes and with its cover off for from 5 to 30 minutes, the maximum temperature being from 70 to 80° C. The alcoholic content of the composition after this second mixing is from 30 to 60 parts per 100 parts of the thermoplastic derivative of cellulose. The composition is now quite tacky but can be readily removed from the mixer. This tacky, plastic composition is then removed to malaxating rolls where it is completely converted after 5 to 10 minutes and substantially all of the alcohol driven off.

In place of alcohol, hot water, wet steam or a mixture of water and acetone may be employed.

In accordance with my process foils, films or sheets are formed in an operation which is continuous with that in which they are applied to the desired base or surface. In this case a thermoplastic composition in the form of a fully converted mass and in a plastic state is passed between heated rolls that are so spaced as to form the foils, films or sheets of desired thickness. The foils, films or sheets thus produced are then continuously applied to the surface to be coated and subjected to the action of heat and pressure to bind the same to said surface. In the process of the present invention the plastic composition releases, without the aid of a doctoring knife or blade, from the calender roll to the base material being coated.

In applying the foils, films or sheets continuously with the formation thereof, a great saving in time is effected since only a short contact under pressure is required to obtain the proper binding action, particularly when the base and the plastic sheet material are suitably preheated. Since the plastic composition gradually absorbs heat as it passes from roller to roller, it does not blister and is of uniform texture and even gauge throughout, and is free of air bubbles regardless of its thickness. Excessive heat and/or pressure is not required in the coating or laminating operation and there is, therefore, no danger of undue flow of material causing uneven application of the plastic composition on the base, or of deleterious effect on the plastic composition.

During the coating operation is is essential that the surface of the article to be coated should be of sufficiently high temperature. Preferably the articles to be coated should be preheated, that is, should be heated prior to the application of the plastic composition thereto. By employing this expedient it is not necessary to apply excessive heat to the thermoplastic composition in order that it may pass through and heat the surface of contact between said thermoplastic material and the base.

I have found that very satisfactory results are obtained by having the temperature of the calender rolls between 145° to 160° C. and the temperature of the fabric being coated about 145° C. Where the plastic composition to be applied to the fabric contains a filler, the temperature of the calender rolls is preferably about 170° C.

After the layer of thermoplastic material is applied to the base by the application of heat and pressure, the uncoated or underside of the coated surface is cooled or chilled. This cooling or chilling step causes the plastic sheet to shrink into the pores or interstices of the base material into which pores or interstices it had previously been drawn or forced due to the heat applied thereto.

While any suitable mechanical devices, such as presses, may be employed for obtaining the required heating, pressing and cooling effects, I prefer to employ rolls for this purpose. Indeed one of the advantages of my invention is that it permits the coating of surfaces with derivative of cellulose plastics by means of rolls, which render possible an extremely high rate of production.

By my invention surfaces of all kinds may be coated. Woven or knitted fabrics made of cotton or other fibers may be coated by this invention, as may also paper, cardboard, pulp, leather and other flexible articles. Sheets, blocks or other articles made of wood, cork, rubber, asbestos board or other relatively porous materials likewise may have a coating of a thermoplastic composition applied thereto. Metals such as steel, iron, nickel, copper, aluminum, in sheet, strip or other form, may likewise be successfully coated. Not only may relatively wide, thin articles such as plates, fabrics and the like be treated by this invention, but continuous lengths of ribbons, rods, profile strips, tubes, moldings, corset stays, insulated wire, lead pencils and the like may have a coating of thermoplastic compounds applied on all surfaces thereof by this invention.

Another application of this invention is in the preparation of specialties, such as netting of cotton, reconstituted cellulose and the like that is covered with a thin layer of thermoplastic composition and adapted to be used in the making of transparent mothproof clothes bags or for wrapping purposes. Likewise, woven wire cloth of various mesh, from fine insect screening to chicken fencing, may have the layer of thermoplastic composition applied thereto in order to close the interstices with a transparent or translucent film of cellulose derivative composition and the resulting product may be used as glass substitutes in poultry houses, greenhouses, storerooms, warehouses and the like. For making such materials, the cloth of reticulated material and the layer of thermoplastic composition are caused to pass between the heated roller, the film being deposited in the meshes without bubbles or so-called "crater" effects which occur when a solution of a cellulose derivative in volatile solvent is applied to such materials.

I have found that advantageous results are obtained by saponifying the surface of the derivative of cellulose coating on the base material, particularly when the plasticizer employed causes the surface to become tacky. Saponification of the surface hardens the same without any substantial loss in the suppleness thereof. Moreover, where a fabric base is coated with a derivative of cellulose plastic composition, embossed, and subjected to superficial saponification, the embossing is substantially permanent.

I prefer to employ the formal of castor oil as the softening agent where the derivative of cellulose coating is to be saponified as this softener reacts only very slowly with alkali. Other softening agents saponify and wash out somewhat.

Saponification of the derivative of cellulose coating is preferably effected with ammonia or sodium hydroxide, the concentration of the same and the duration of treatment depending upon the degree of saponification desired. Satisfactory results may be obtained by treating the coated fabric for fourteen hours with ten times the weight of the fabric of 0.5% ammonia solution, or for one hour with ten times the weight of the fabric of a 0.5% sodium hydroxide solution.

After saponification, the saponified coated fabric may be finished with 2%, based on the weight of the fabric, of diethylene glycol to render the coated fabric more supple. Glycerine or other softening agents may be employed in place of the diethylene glycol. This treatment does not make the coating sticky.

While, as above stated, this invention is applicable to the coating of various articles, it is of particular advantage in the coating of cotton fabrics to form artificial leather. The artificial leather formed in accordance with this invention is supple, flexible and strong, and shows little tendency to crack upon sharp bending. The coating composition adheres to the base fabric. The thermoplastic composition is completely converted and the pigment is evenly dispersed throughout the composition.

In the accompanying drawing the figure is a diagrammatic showing of one means for carrying out my invention.

In the drawing the reference numeral 1 indicates a substantially completely converted thermoplastic material which may be continuously supplied by malaxating rolls (not shown) on which complete conversion of the thermoplastic material is effected. The thermoplastic material is passed between the rolls 2, 3, 4, 5 and 6 of, for example, a calendering device, which rolls are preferably heated by steam although any other heating means may be employed. The thermoplastic material as it is passed between rolls 2 and 3 is formed into a sheet, which sheet is passed between rolls 3 and 4 and then between rolls 4 and 5. The latter pair of rolls is so spaced as to form a film or sheet A of a thickness which is desired to apply to the base material B.

This base material B, which may be paper, cardboard, fabric or other flexible material is taken from a supply roll 7 and passed in contact with a series of rolls 8, 9, 10 and 11 which are preferably heated by steam, gas or any other heating means whereby the material B is heated before it reaches the point at which the thermoplastic material A is to be applied thereto. The preheated base material B as it leaves the last roll 11 of the series is passed over an idler guide roller 12 and in between rolls 5 and 6 of the calendering device where sheet A of thermoplastic material is pressed thereon. It has been found preferable in some cases to place idler guide roller 12 in such a position (shown in the figure) that the sheet B contacts the plastic coated roller 5 before the plastic sheet A is pressed upon sheet B. This preliminary contact permits of the use of a reduced pressure whereby, particularly where loosely woven materials are employed as the base material, the plastic is not forced through to the back of said base fabric. The coated sheet is then passed in contact with idler guide rollers 13 and 14 and is then passed in contact with a roll 15 which is kept cold by means of cold brine or other cooling medium, the arrangement being such that the cooling is effected on the base side of the assembly and not through the thermoplastic material. The coated material after being cooled is taken up in the form of a package 16.

In order further to illustrate my invention, but without being limited thereto, the following specific examples are given.

*Example I*

100 parts by weight of dry ground cellulose acetate are mixed with 25 parts of dimethoxy ethyl phthalate and 75 parts of a mixture of ethyl orthotoluene sulphonamide and ethyl paratoluene sulphonamide, 5 parts of formal of castor oil and 80 parts of ethyl alcohol in an S-type Werner-Pfleiderer mixer for fifteen minutes. The mixture is then permitted to stand covered for about sixteen hours. The resulting very viscous semi-transparent jel is removed to a Z-type Werner-Pfleiderer steam-jacketed mixer where it is mixed for ten minutes with the cover of the mixer on and for fifteen minutes with the cover off, the temperature of the mixer being 75° C. The alcohol content of the composition after this latter mixing is approximately 45 parts per 100 parts of cellulose acetate. The tacky plastic mass is removed from the latter mixer to malaxating rolls heated to a temperature of 125° C. where the batch is completely converted after about ten minutes of operation. The converted plastic composition is transferred to a five roll calender operated at a temperature of 145° to 160° C. where the plastic is applied to cotton drill cloth which is preheated to a temperature of about 145° C.

The coated drill cloth produced is supple, flexible and strong and shows little tendency to crack on sharp bending. The plastic adherence to the drill cloth is firm.

*Example II*

100 parts by weight of dry ground cellulose acetate are mixed with 75 parts of dimethoxy ethyl phthalate and 25 parts of triacetin, 5 parts of formal of castor oil and 60 parts of ethyl alcohol in an S-type Werner-Pfleiderer mixer for fifteen minutes. The mixture is then permitted to stand covered for about sixteen hours. The resulting very viscous semi-transparent jel is removed to a Z-type Werner-Pfleiderer steam-jacketed mixer where it is mixed for ten minutes with the cover of the mixer on and for fifteen minutes with the cover off, the temperature of the mixer being 75° C. The alcohol content of the composition after this latter mixing is approximately 45 parts per 100 parts of cellulose acetate. The tacky plastic mass is removed from the latter mixer to malaxating rolls heated to a temperature of 125° C. where the batch is completely converted after ten minutes of operation. The converted plastic composition is transferred to a five roll calender operated at a temperature of 145° to 160° C. where the plastic is applied to sateen which is preheated to a temperature of about 145° C.

The coated sateen produced is supple, flexible and strong and shows little tendency to crack on sharp bending. The plastic adherence to the sateen is firm.

*Example III*

100 parts by weight of dry ground cellulose acetate are mixed with 70 parts of a mixture of ethyl orthotoluene sulphonamide and ethyl paratoluene sulphonamide, 20 parts of dimethoxy ethyl phthalate, 5 parts of dibutyl phthalate, 5 parts of oxidized olive oil and 100 parts of ethyl alcohol in an S-type Werner-Pfleiderer mixer for fifteen minutes. The mixture is then permitted to stand covered for about sixteen hours. The resulting very viscous semi-transparent jel is removed to a Z-type Werner-Pfleiderer steam-jacketed mixer where it is mixed for ten minutes with the cover of the mixer on and for fifteen minutes with the cover off, the temperature of the mixer being 75° C. The alcohol content of the composition after this latter mixing is approximately 45 parts per 100 parts of cellulose acetate.

The tacky plastic mass is removed from the latter mixer to malaxating rolls heated to a temperature of 125° C. where the batch is completely converted after about ten minutes of operation. The converted plastic composition is transferred to a five roll calender operated at a temperature of 145° to 160° C. where the plastic is applied to cotton drill cloth which is preheated to a temperature of about 145° C.

The coated drill cloth produced is supple, flexible and strong and shows little tendency to crack on sharp bending. The plastic adherence to the drill cloth is firm.

*Example IV*

The same procedure is followed as in Example I except that one-half part by weight of black lacquer chips (black pigment predispersed in cellulose acetate) is ground in a dope solution of cellulose acetate and added to the plastic composition while it is being mixed in the S-type Werner-Pfleiderer mixer. A very good black coating is formed on the drill.

It is to be understood that the foregoing description is given merely by way of illustration and that many variations may be made therein, without departing from the spirit of my invention.

Having described my invention what I desire to secure by Letters Patent is:

1. Process for the production of coated materials by a calendering process, which comprises mixing together a cellulose derivative, a plasticizer therefor, and a substantially volatile swelling agent for the cellulose derivative, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the cellulose derivative.

2. Process for the production of coated materials by a calendering process, which comprises mixing together cellulose acetate, a plasticizer therefor, and a substantially volatile swelling agent for the cellulose acetate, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the cellulose acetate.

3. Process for the production of coated materials by a calendering process, which comprises mixing together a cellulose derivative, a plasticizer therefor, and alcohol, allowing the mixture to stand until a gel is formed, subjecting the gel to the action of heat in a closed vessel for a short period, and then for a further short period in an open vessel, until the content of alcohol has been substantially reduced, then working the mixture on malaxating rolls until substantially all the alcohol has been removed, and thereafter transferring the converted mixture thus obtained to calendering rolls and uniting the converted mixture to a base material in the substantial absence of solvent for the cellulose derivative.

4. Process for the production of coated materials by a calendering process, which comprises mixing together a cellulose acetate, a plasticizer therefor, and alcohol, allowing the mixture to stand until a gel is formed, subjecting the gel to the action of heat in a closed vessel for a short period, and then for a further short period in an open vessel, until the content of alcohol has been substantially reduced, then working the mixture on malaxating rolls until substantially all the alcohol has been removed, and thereafter transferring the converted mixture thus obtained to calendering rolls and uniting the converted mixture to a base material in the substantial absence of solvent for the cellulose acetate.

5. Process for the production of coated materials by a calendering process, which comprises mixing together a cellulose derivative, a plasticizer therefor, a substantially volatile swelling agent for the cellulose derivative and a vegetable oil, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the cellulose derivative.

6. Process for the production of coated materials by a calendering process, which comprises mixing together a cellulose acetate, a plasticizer therefor, a substantially volatile swelling agent for the cellulose acetate and a vegetable oil, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the cellulose acetate.

7. Process for the production of coated materials by a calendering process, which comprises mixing together a cellulose derivative, a plasticizer therefor, a substantially volatile swelling agent for the cellulose derivative and a formal of castor oil, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls, uniting the converted mixture to a base material in the substantial absence of solvent for the cellulose derivative and saponifying the surface of the coating formed on said base material.

8. Process for the production of coated materials by a calendering process, which comprises mixing together a cellulose acetate, a plasticizer therefor, a substantially volatile swelling agent for the cellulose acetate and a formal of castor oil, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls, uniting the converted mixture to a base material in the substantial absence of solvent for the cellulose acetate and saponifying the surface of the coating formed on said base material.

GEORGE SCHNEIDER.